Figure 1:
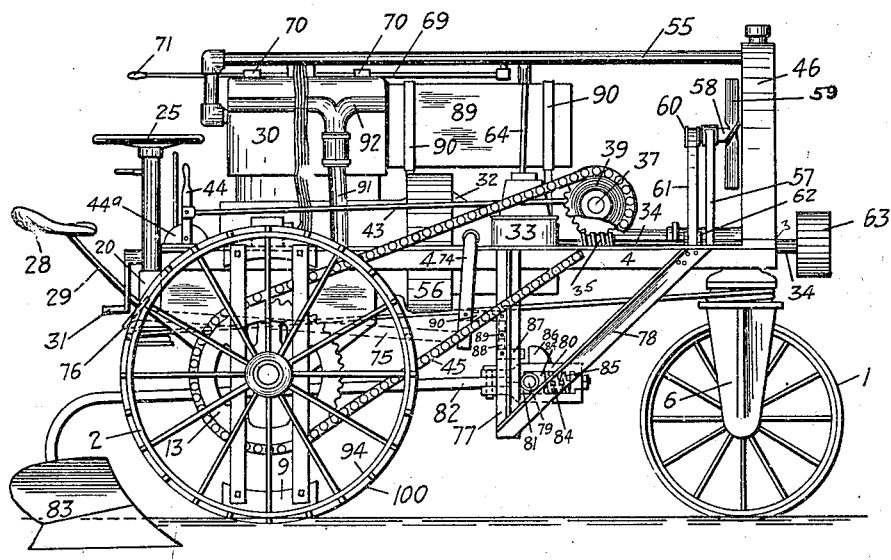

Feb. 13, 1923.

F. E. ROBERTS ET AL.
TRACTOR.
FILED MAR. 18, 1920.

1,445,172.

3 SHEETS—SHEET 1

INVENTORS
Frank E. Roberts and Raymond
J. Hemsteger
BY Howard S. Smith
Their ATTORNEY.

Feb. 13, 1923.

F. E. ROBERTS ET AL.
TRACTOR.
FILED MAR. 18, 1920.

1,445,172.

3 SHEETS—SHEET 2.

INVENTORS,
Frank E. Roberts and Raymond
J. Hemsteger,
BY Howard S. Smith
Their ATTORNEYS Feb. 13, 1923.  1,445,172.
F. E. ROBERTS ET AL.
TRACTOR.
FILED MAR. 18, 1920. 3 SHEETS—SHEET 3.
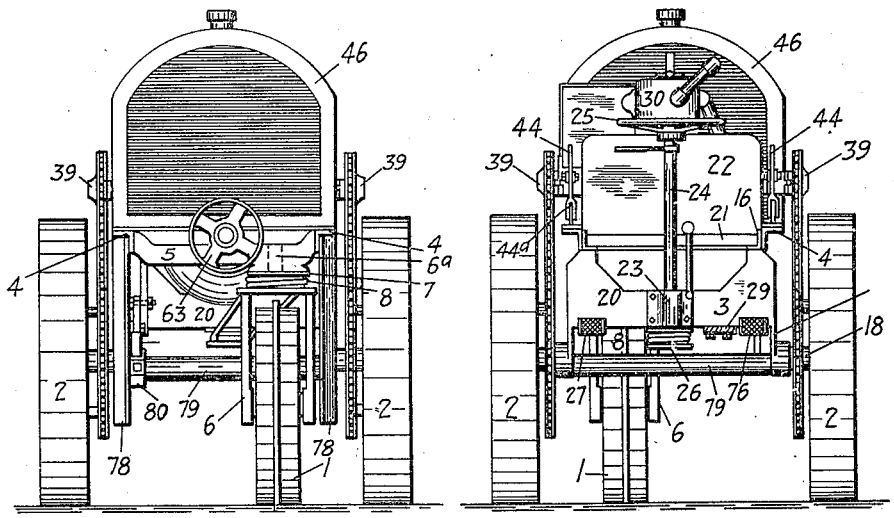
Fig. 3  Fig. 4
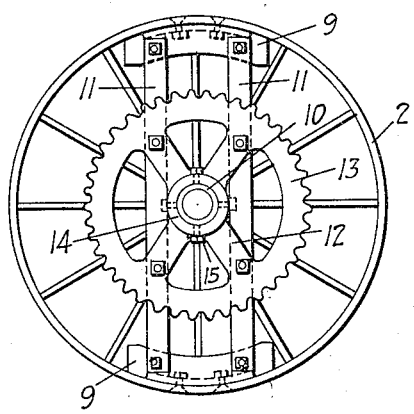 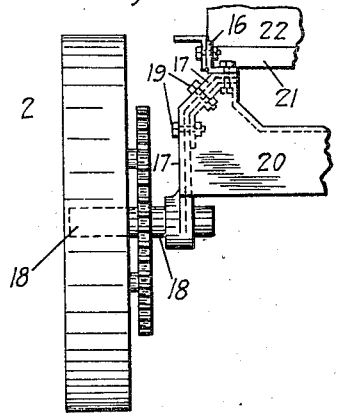
Fig. 5  Fig. 6
INVENTORS.
Frank E. Roberts and Raymond
J. Hemsteger,
BY Howard S. Smith
Their ATTORNEY.

Patented Feb. 13, 1923.

1,445,172

UNITED STATES PATENT OFFICE.

FRANK E. ROBERTS AND RAYMOND J. HEMSTEGER, OF DAYTON, OHIO.

TRACTOR.

Application filed March 18, 1920. Serial No. 366,841.

*To all whom it may concern:*

Be it known that we, FRANK E. ROBERTS and RAYMOND J. HEMSTEGER, citizens of the United States, residing at Dayton, in the county of Montgomery and State of Ohio, have invented certain new and useful Improvements in Tractors, of which the following is a specification.

One of the principal objects of our invention is the provision of a tractor that contains an engine whose position is the reverse of that normally occupied by an engine in a horseless vehicle. In this position of the engine, many parts are eliminated, thereby reducing the weight of the tractor. The cranking mechanism and other controls are thereby also made accessible to the driver without the necessity of his leaving his seat.

Another object of our invention is the provision of a worm and sprocket drive for the tractor. Such a drive conduces to simplicity by eliminating many moving parts, and possesses enormous strength.

Another object of our invention is the provision of toggle means which permit the driver, from his seat, to shift the gears in the transmission case as conveniently and efficiently as when the transmission gears are behind, rather than in front of, the engine.

It is still another object of our invention to place the draw bar of the tractor lower than the center of the drive wheels, whereby, when the tractor is propelled, the frame will be pulled toward the ground, giving better tractive force. The draw bar is also placed in front of the driving wheels to assist in increasing their tractive power. The drive wheels themselves are low, thereby resulting in a lighter machine which can readily travel over soft earth.

It is still another object of our invention to increase the tractive force of the drive wheels by placing specially designed ribs thereon.

Another object of our invention is to provide for each drive wheel, a sprocket which imparts a driving force to both the rim and the hub of the wheel by means hereinafter to be described.

It is another object of our invention to provide means for automatically throwing out the clutch when the plow or other cultivating attachment on the tractor encounters an obstruction.

Other important and incidental objects will be brought out in the following specification, and particularly set forth in the subjoined claims.

Figure 7:
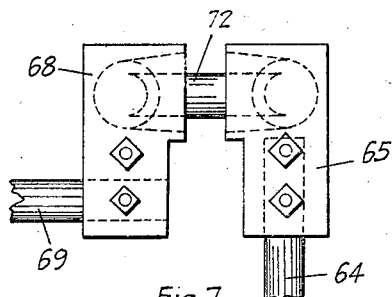
Figure 8:
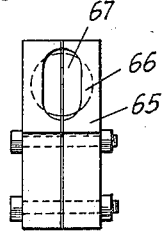
Figure 9:
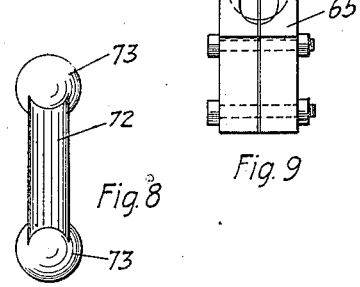
Figure 10:
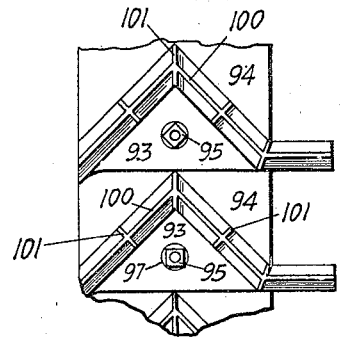
Figure 11:
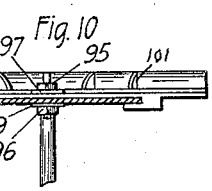
Figure 2:
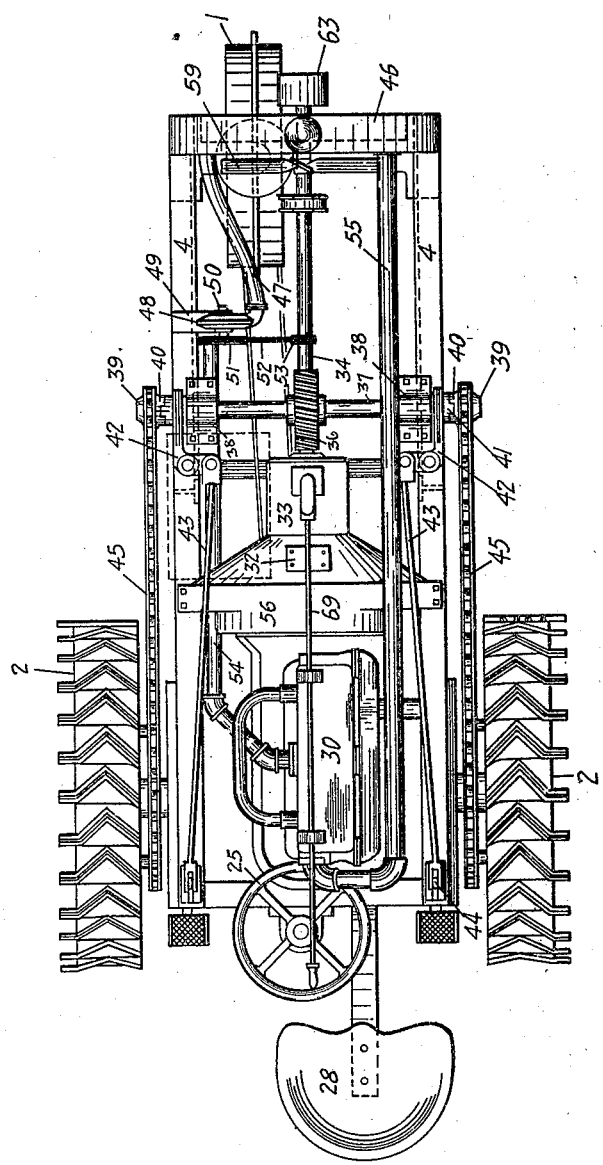

One form of embodiment of our invention is illustrated in the accompanying drawings, of which Figure 1 is a side view of our tractor. Figure 2 is a top plan view thereof. Figure 3 is a front view of the tractor. Figure 4 is a rear view of the same. Figure 5 is a side view of one of the driving wheels, showing the sprocket wheel thereon, and the means whereby the latter rotates the driving wheel from both the rim and the hub thereof. Figure 6 is a rear view of one side of the tractor, showing how the latter is constructed to straddle growing plants. Figure 7 is a side view of the gear-shift toggle mechanism. Figure 8 is a side view of the link member. Figure 9 is an end view of a socket member. Figure 10 is a plan view of the drive wheel ribs. And Figure 11 is a section through a wheel rim, showing them.

Throughout the specification and drawings, similar reference characters denote corresponding parts.

Referring to the accompanying drawings, the numeral 1 designates the front wheel, the numerals 2, 2 the rear driving wheels, of a tractor 3; and the numerals 4, 4 the side members of the tractor frame, which consist of angle bars between the front ends of which there is secured an arched transverse bar 5. The front wheel 1 is journaled in an inverted U-shaped yoke 6 from which there projects upwardly, for pivotal connection to a downwardly projecting portion of the bar 5 by means of a pin 6ª, a grooved member 7 around which passes, in two or more turns, a guiding cable 8. The front wheel is located at one side of the machine so as not to strike growing plants that are being cultivated. (See Figures 1, 2 and 3.)

Each driving wheel 2 is constructed as follows. Referring to Figure 5, there are bolted to the interior portion of the rim of each driving wheel, at places diametically opposite each other, blocks 9, 9 formed to fit the curvature of the rim. Bolted to the blocks 9, 9, and projecting diametrically between them, one on each side of the hub 10 of the wheel, are bars 11, 11 to which are bolted the spokes 12 of a sprocket wheel 13 having a hub 14 that is firmly secured, by means of screw bolts 15, to the hub 10 of the wheel 2. Therefore, when the sprocket wheel 13 is rotated by means to be hereinafter described, the wheel 2 will be turned thereby from both its hub and rim, thus making the pull thereon uniform.

Referring to Figure 6, there is bolted to the rear portion of each angle iron 4, the vertical portion of an angle iron 16 to the bottom of whose horizontal portion is bolted the horizontal top portion of a trunnion 17. Each trunnion inclines downwardly and outwardly from its horizontal portion to a vertical part that terminates at its lower end in a stub shaft 18 adapted to receive the hub 10 of a driving wheel 2. Secured by bolts 19 to the interior portion of each trunnion 17 is a transverse member 20 preferably recessed at its middle portion and elevated sufficiently above the ground to clear the tops of growing plants. By the employment of the trunnions just described, a solid axle, which would strike the tops of growing plants when the tractor is moved over a field, is eliminated.

Supported upon the top parts of the horizontal portions of the angle irons 16, 16, at the rear ends thereof, is a cross bar 21 from which there projects upwardly a metal shield 22.

Bolted to the middle portion of the transverse member 20 is a bracket bearing 23 in which is journaled the lower end of a steering shaft 24 to the top portion of which there is fast a steering wheel 25, and to its lower end a pulley or spool 26 around which is wound, in two or more turns, the other end of the endless cable 8. (See Figure 4.) By means of this cable, which extends under the frame from the grooved member 7 to the spool 26, the front wheel 1 may be readily turned by the steering wheel 25 to guide the tractor.

Secured to the left hand corner portion of the member 20 as shown in Figure 4, is a foot rest 27 accessible from a seat 28 mounted upon a support 29 secured to the member 20. (See Figure 1).

Supported by the angle bars 4, 4, in a position approximately over the driving wheels 2, 2, is an explosive engine 30. The position of this engine is just the reverse of that ordinarily occupied by an explosive engine in a horseless vehicle, the crank 31 therefor being at the rear of the machine for operation by the driver without the necessity of his leaving the seat 28.

Supported between the angle bars 4, 4 in front of the engine 30, is a clutch 32; and in front of the latter there is mounted, between the angle bars 4, 4, a selective transmission mechanism 33. Fast on the transmission shaft 34 is a worm 35 in mesh with a gear 36 fast on a transverse shaft 37 journaled in bearings 38, 38, preferably of the roller type, secured to the side bars 4, 4. Loosely mounted on each outer end of the shaft 37 is a sprocket wheel 39 on the inner end of whose hub is formed the female portion 40 of a dog clutch. Keyed to each end of the shaft 37 is a male dog clutch member 41 adapted to be shifted into engagement with its respective female member 40 by the usual type of spring (not shown), and to be withdrawn from engagement with said member by a bell-crank lever 42 pivotally secured to a respective side bar 4.

Pivotally secured to the free end of each bell-crank lever 42 is a rod 43 that projects rearwardly for pivotal connection to the middle portion of a hand lever 44 whose lower end is pivotally secured to a semicircular plate 44ª projecting upwardly from the rear end of a respective side bar 4. By means of the hand levers 44, 44 the driver can control the rotation of the sprocket wheels 39, 39 by the shaft 37; and since the latter sprocket wheels are connected by link belt chains 45, 45, to the sprocket wheels 13, 13 on the driving wheels 2, 2, the driver, by operating one lever, can disconnect one driving wheel 2 from the power line to cause the power transmitted to the other driving wheel to effect a sharp turning movement of the tractor. (See Figures 1, 2 and 4). This worm and sprocket drive just described conduces to simplicity and possesses enormous strength.

Referring to Figures 1, 2 and 3, there is mounted on the side bars 4, 4 at the front end of the machine, a radiator 46. The latter is connected at its lower end by a hose 47 to a rotary pump 48 mounted on a support 49 secured to a side bar 4. This pump is operated in the usual manner by a shaft 50 on which is fast a sprocket wheel 51 rotated by a sprocket chain 52 that passes around a sprocket wheel 53 fast on the line shaft 34. A pipe 54 connects the pump 48 with the engine 30 to conduct cooling water thereto, while the hot water is returned from the engine to the radiator 46 by a long pipe 55 that passes over the fly wheel housing 56, clutch 32 and transmission mechanism 34. The length of this pipe 55 is such that much heat is withdrawn from the hot water from the engine before it reaches the radiator 46.

Mounted on a fan bracket 57 behind the radiator 46 is a fan shaft 58 on the front end of which a fan 59 is secured. On the rear end of the fan shaft 58 there is secured a pulley 60 that is turned, to rotate the fan 59, by a belt 61 that passes around a pulley 62 fast on the line shaft 34. (See Figures 1 and 2.)

The line shaft 34, which projects in front of the radiator 46, has secured to its forward end a pulley 63 for power transmitting purposes.

Projecting upwardly from the transmission mechanism 33 is a gear-shift lever 64 that is moved laterally and longitudinally by the following means. The upper end of the lever 64 is bolted between the two sections of a vertical block 65. Formed in the enlarged upper ends of said sections are recesses that form together a spherical cavity 66 in front of which there is provided a vertical slot 67. In alinement with the block 65 is a similar block 68 secured at its lower end to a horizontal rod 69 that projects rearwardly through brackets 70, 70 on the engine 30 to a point to bring its handle end 71 within easy access of the driver. Loosely projecting through each vertical slot portion 67 of the vertical blocks 65 and 68 is a link member 72 whose height is greater than its width. This link member has formed on each end a ball 73 that fits loosely within a respective cavity 66 of a block member, and is held therein by the vertical slot 67 in front of it and through which the link 72 projects. (See Figures 7, 8 and 9.) By means of this construction, the driver can turn the rod 69 to move the selective gear shift lever 64 laterally, since the link 72 is adapted, when moved sidewise, to engage the vertical wall of the slot 67 of the member 65 to which the upper end of the lever 64 is secured. On the other hand, the slots 67, 67 are long enough to permit a vertical movement of the link 72 within them when the rod 69 is moved longitudinally to so move the lever 64 for the purpose of shifting the selective gears. During this shifting operation, the ball portions 73, 73 of the link 72 are permitted a free turning movement within their respective cavities 66, 66 of the block members. Through this toggle mechanism the shift lever 64 may be operated as efficiently as when grasped by the hand of the driver.

The following means are provided for throwing out the clutch before the transmission gears are shifted. The clutch 32 is operated in the usual manner by a downwardly projecting lever arm 74 to the lower end of which is pivotally secured a rod 75 terminating at its rear end in a foot rest 76 which, when pressed upon by the driver's foot, will move the lower end of the lever arm 74 forwardly to throw out the clutch. (See Figures 1 and 4.)

Projecting downwardly from each side bar 4 is a vertically disposed angle iron 77 to the lower end of which is connected a bracing angle iron 78 that inclines upwardly toward the front of the machine for connection to the side bar 4. (See Figure 1.) Supported between the lower ends of the angle irons 77 and 78 is a draw bar 79.

Secured to the draw bar 79 is a pull block 80 containing a horizontal slot 81 through which the draw bar passes. Bolted to the rear part of the pull block 80 is the tongue 82 of a plow 83. While we have shown a plow attached to this pull block, any other agricultural implement may be secured thereto if desired.

For the purpose of automaticaly throwing out the clutch 32 when the plow 83 strikes an obstruction, the following means are provided. Secured within the slot 81 of the pull block 80 around a guide pin 84, is a coil spring 85, the rear end of which is adapted to bear against a piece 84$^a$ butted against the draw bar 79, while the front end of said spring presses against the inner front portion of the pull block. (See Figure 1.) Projecting upwardly from the top rear portion of the pull block is a lug 86 adapted, when the pull block is drawn rearwardly a sufficient distance, to engage and move rearwardly a horizontal projection 87 on the lower end of a lever 88 pivotally mounted on a cross bar 89, the upper end of said lever being pivotally connected by a link 90 to the lower end of the clutch lever 74. The tension of the spring 85 is such as to prevent engagement between the lug 86 and projection 87 on the lever 74 when the normal pull is exerted upon the pull block 80 by the plow. But when the plow strikes an obstruction, the momentary pull of the plow upon the pull block 80 will be of such great strength as to compress the coil spring 85 sufficienly to permit the lug 86 to strike the projection 87 on the lever 88, and move it sufficiently far to throw out the clutch. With the clutch thus automatically thrown out, the driver, by means of the rod 69, may shift to the reverse gear in the transmission mechanism for the purpose of reversing the tractor to back away from the obstruction.

It will be observed that the draw bar of the tractor is below the center of the driving wheels 2, 2, whereby, when the tractor is propelled, the frame will be pulled down toward the ground, giving better tractive force. The placing of the draw bar in front of the driving wheels, which are themselves low, assists in increasing their tractive power.

Above the clutch and transmission mechanism, and below the water pipe 55, a fuel tank 89 is supported by standards 90, 90. A vertical exhaust pipe 91 connected to the exhaust manifold 92 of the engine 30, discharges the exhaust gases at a point where they will not be obnoxious to the driver. (See Figure 1.)

The following described means are provided for attachment to the outer periphery of the rim of each driving wheel to increase its tractive grip upon the ground. Referring to Figures 1, 10 and 11, there are successively secured around said rim curved plates 93. Each plate 93 is secured to the rim 94 of the wheel by a bolt 95 to the lower end of which a nut 96 is applied. Between the head of each bolt 95 and the plate is a washer 97, while a washer 99 is placed between the rim 94 and the nut 96. Projecting outwardly from each plate 93 is a rib 100 which forms with the base of the plate a triangular figure. Each rib 100 has a flat base portion from which project upwardly, on each side of the vertical portion of the rib, curved bracing flanges 101. Beyond the outer circular edge of the rim 94, each rib 100 projects a short distance to increase the tractive grip of the wheel.

Having described our invention, we claim:

1. In a device of the type described, the combination with a frame, of a front wheel, and a pair of rear driving wheels therefor, an explosive engine mounted on said frame, a driver's seat supported by the latter behind said engine, a clutch mounted in said frame in front of said engine, a variable-speed transmission mechanism for rotating said driving wheels, mounted in said frame in advance of said clutch, a shift lever for operating said transmission mechanism, a horizontal control rod projecting rearwardly over said engine to a point in front of the driver's seat, and a toggle device for connecting the front end of said control rod and the upper end of said shifting lever, for permitting the latter to be moved laterally and longitudinally for the purpose specified.

2. In a device of the type described, the combination with a frame, of a front wheel, and a pair of rear driving wheels therefor, an explosive engine mounted on said frame, a clutch mounted in front of said engine in said frame, a variable-speed transmission mechanism for rotating said driving wheels, mounted in said frame in avance of said clutch, a shift lever for operating said transmission mechanism, a horizontal control rod projecting rearwardly over said engine to a point in front of the driver's seat, a block member having a vertical slot behind which is a spherical cavity, secured to the upper end of said shift lever, a similar block member secured to the front end of said horizontal rod, a rod adapted to project through the vertical slot in each member, and a ball-shaped element secured to each end of said rod, loosely movable within the spherical cavity in its respective member, for permitting the shift lever to be moved laterally and longitudinally by the horizontal rod for the purpose specified.

3. In a device of the type described, the combination with a frame, of a front wheel, and a pair of rear driving wheels, therefor, an explosive engine mounted on said frame, a variable-speed transmission mechanism for rotating said driving wheels, mounted in said frame in front of said engine, a clutch supported by said frame between said engine and transmission mechanism, a downwardly projecting operating lever for said clutch, and foot-controlled means projecting beneath the engine for actuating said clutch-operating lever.

In testimony whereof we have hereunto set our hands this 13th day of March, 1920.

FRANK E. ROBERTS.
RAYMOND J. HEMSTEGER.

Witness:
HOWARD S. SMITH.